(12) United States Patent
Stoutamire (10) Patent No.: US 6,211,889 B1
(45) Date of Patent: Apr. 3, 2001

(54) METHOD AND APPARATUS FOR VISUALIZING LOCALITY WITHIN AN ADDRESS SPACE

(75) Inventor: David P. Stoutamire, San Juan Bautista, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/108,049

(22) Filed: Jun. 30, 1998

(51) Int. Cl.$^7$ .................................................. G06T 11/20
(52) U.S. Cl. ........................................... 345/442; 345/521
(58) Field of Search ........................... 345/442; 395/406, 395/711, 677, 684; 382/249; 704/269; 257/365; 711/1.202–1.215, 170

(56) References Cited

U.S. PATENT DOCUMENTS

| | | | |
|---|---|---|---|
| 4,843,468 | * | 6/1989 | Drewery .............................. 358/140 |
| 5,602,943 | | 2/1997 | Velho et al. . |
| 5,852,443 | * | 12/1998 | Kenworthy ............................ 345/431 |

OTHER PUBLICATIONS

Web Page entitled, "PatchWrx—A Dynamic Execution Tracing Tool", Oct. 1995, By: Richard L. Sites and Sharon E. Perl, Digital Equipment Corp, Systems Research Center, Palo Alto, CA, pp. 1–17, Additional Pages: Figures 7 & 8, Figures 9 & 9a, Figures 10 & 11, URL=http://www.research.digital.com/SRC/personal/Dick Sites/patchwrx/PatchWrx.html.

Article: "Studies of Windows NT Performance Using Dynamic Execution Traces", Usenix 2d Symposium on OS Design and Implementation (OSDI '96), Oct. 28–31, 1996, Seattle, Washington, Co–Sponsored by ACM SIGOPS and IEEE TCOS, By: Richard L. Sites and Sharon E. Perl, Digital Systems Research Center, Palo Alto, CA, pp. 1–15, Additional Pages: Frame 211, Frame 295.

Web Page entitled, "Notes on A Cube–filling Hilbert Curve", By: William J. Gilbert, Printed: Jun. 30, 1998, p. 1 of 1, URL=http://math.uwaterloo.ca/~wgilbert/Research/Hilbert-Curve/HilbertCurveNotes.html.

Web Page entitled, "An Introduction to Chaos Theory and Fractals", Printed: Mar. 6, 1998, pp. 1–13, URL=http://www.geocities.com/CapeCanaveral/9753/AmChaosIntro.html.

Web Page entitled, "Fractal Frequently Asked Questions and Answers," Printed: Mar. 6, 1998, Last Updated: Feb. 5, 1998, pp. 1–37, URL=http://www.faqs.org/faqs/fractal–faq.

Article: "Fractals for Secondary Key Retrieval", By: Christos Faloutsos and Shari Roseman, University of Maryland, College Park, pp. 1–17, URL=http://www.cs.umd.edu/TRs/Trumiacs.html.

Article: "Space Filling Curves and Their Use in the Design of Geometric Data Structures", By: Tetsuo Asano, Desh Ranjan, Thomas Roos, Emo Welzl and Peter Widmayer, Second International Symposium of Latin American Theoretical Informatics Latin '95 LNCS 911, pp. 1–13, URL=http://www.inf.ethz.ch/personal/roos/roos/publications.html.

(List continued on next page.)

Primary Examiner—Mark R. Powell
Assistant Examiner—G. F. Cunningham
(74) Attorney, Agent, or Firm—Beyer Weaver & Thomas LLP (57) ABSTRACT

A method and that display certain aspects of a computer memory on a display screen in accordance with a fractal curve. In at least one embodiment, the fractal curve is a Hilbert curve. The fractal curve display can be used as an aid in visualizing various types of information about a computer memory. Certain embodiments have a display that remains static, while other embodiments have a display that is dynamic and changes in real-time to reflect changes in memory.

22 Claims, 9 Drawing Sheets

OTHER PUBLICATIONS

Article: "High Performance Fortran for Highly Irregular Problems", By: Y. Charlie Hu, S. Lennart Johnsson and Shang–Hua Teng, Sixth ACM Sigplan Symposium on Principles and Practice of Parallel Programming, (PPoPP97), Las Vegas, NV, Jun. 1997, pp. 1–12, URL:http://www.cs.rice.edu/~ychu/nbody.html.

Article: "Halftoning with Selective Precipitation and Adaptive Clustering", By: Tien–tsin Wong and Siu–chi Hsu, Graphics Gems V, edited by Alan Paeth, AP Professional, 1995, pp. 1–12, URL=http://www.cse.cuhk.edu.hk/~ttwong/papers/halftone/stc.html.

* cited by examiner

| Input (Current rotation) | Input (Address bits) | Output (x,y) | Output (next rotation) |
|---|---|---|---|
| l | 00 | 0,0 | U |
| l | 01 | 1,0 | l |
| l | 10 | 1,1 | l |
| l | 11 | 0,1 | D |
| L | 00 | 0,1 | d |
| L | 01 | 1,1 | L |
| L | 10 | 1,0 | L |
| L | 11 | 0,0 | u |
| r | 00 | 1,1 | D |
| r | 01 | 0,1 | r |
| r | 10 | 0,0 | r |
| r | 11 | 1,0 | U |
| R | 00 | 1,0 | u |
| R | 01 | 0,0 | R |
| R | 10 | 0,1 | R |
| R | 11 | 1,1 | d |
| u | 00 | 1,0 | R |
| u | 01 | 1,1 | u |
| u | 10 | 0,1 | u |
| u | 11 | 0,0 | L |
| U | 00 | 0,0 | l |
| U | 01 | 0,1 | U |
| U | 10 | 1,1 | U |
| U | 11 | 1,0 | r |
| d | 00 | 0,1 | L |
| d | 01 | 0,0 | d |
| d | 10 | 1,0 | d |
| d | 11 | 1,1 | R |
| D | 00 | 1,1 | r |
| D | 01 | 1,0 | D |
| D | 10 | 0,0 | D |
| D | 11 | 0,1 | l |

METHOD AND APPARATUS FOR VISUALIZING LOCALITY WITHIN AN ADDRESS SPACE

BACKGROUND

This application relates to computers and computer systems and further relates to a method and apparatus for visually displaying various aspects of memory.

As computer systems become more complex, it is becoming more difficult for human beings to easily understand and grasp all the intricacies involved in any given computer system.

During execution, a computer system may move units of memory, such as pages or cache lines, between units of hardware. As more complex caching systems are designed and as caching systems begin to have more and more levels, it is becoming more and more difficult for human beings to understand whether a given caching system is operating efficiently for the software executing on the computer system.

Software currently exists to aid a human being in visualizing certain aspects of a computer's memory, such as the performance impact of caching. These conventional software programs, however, display memory using a line-by-line display on a display device. For example, in such a line-by-line display, a pixel representing information about a first unit of memory is displayed on a first line in a first column of a display screen. A pixel representing information about a second unit of memory is displayed on a first line in a second column of the display screen. A pixel representing information about a last unit of memory may be displayed on a last line in a last column of a display screen, and so on. Pixels representing information about intermediate units of memory are displayed, one after the other, on consecutive rows and in consecutive columns within each row (or vice versa in consecutive columns and rows).

The term "locality of memory" refers to the location of data (e.g., variables) within memory in time and space. Accessing a variable closely in time is called "temporal locality." Accessing variables stored physically close together is called "spatial locality." Physical locations in a memory that are close together have a high spatial locality. For example, a variable that is read from close together in time has a high temporal locality. For example, a $49^{th}$ memory unit and a $50^{th}$ memory unit (such as bits, bytes, words, pages, etc.) that are physically close to each other in a computer memory have a high spatial locality. As another example, if a variable is read twice in quick succession, the variable has a high temporal locality. On modern computer systems, temporal and spatial locality impact performance.

Unfortunately, in conventional line-by-line visualization software, even though a $49^{th}$ memory unit is physically contiguous to a $50^{th}$ memory unit in the actual memory of the computer, it is entirely possible that the display pixels corresponding to the memory units will be on opposite sides of the display screen. For example, the pixel corresponding to the $49^{th}$ memory unit might be the last column in row n, while the pixel corresponding to the $50^{th}$ memory unit might be displayed in the first column of row n+1. Because conventional visualization tools do not necessarily show memory units having a high locality as being physically near each other on the display, conventional visualization tools are not ideal for aiding a human being in visualizing how various memory units relate to each other or for visualizing locality.

Another example of conventional visualization software displays memory accesses by address on one axis of a graph and time on the other axis. This method also fails to present data in a way that effectively aids human understanding of the relationships between the data.

SUMMARY OF THE INVENTION

The described embodiments of the present invention provide a method and apparatus that display certain aspects of a computer memory on a display screen in accordance with a fractal curve instead of a line-by-line display. In at least one embodiment, the fractal curve is a Hilbert curve. The fractal curve display can be used as an aid in visualizing various types of information about a computer memory. Certain embodiments have a display that remains static, while other embodiments have a display that is dynamic and changes in real-time to reflect changes in memory.

For example, the display can be used as an aid to visualize memory access patterns, such as when and/or where read or write operations occur in a computer memory. As a second example, the display can be used as an aid to visualize which pages are currently being swapped in or out of various levels of memory in a virtual memory system. As a third example, the display can be used as an aid to visualize which cache lines are active in a caching system. As a fourth example, the display can be used as an aid to visualize which pages are being swapped into memory. As a fifth example, the display can be used as an aid to visualize the read/write permissions of various pages of memory. As a sixth example, the display can be used as an aid to visualize the shared/modified exclusive states of cache lines.

Use of a Hilbert curve as an aid in visualizing memory has the advantage that it allows memory groups equal to powers of two to be displayed near each other. For example, display bits of the fractal curve corresponding to memory addresses 00xxxxxx, where xx is any value, are grouped in a same quadrant of the memory display. Similarly, display bits of the fractal curve corresponding to memory address 0000xxxx are grouped within a sub-quadrant of the quadrant holding display bits for the addresses 00xxxxxx. Display bits of the fractal curve corresponding to memory address 000000xx are grouped within a sub-sub-quadrant of the quadrant holding display bits for the addresses 0000xxxx, and so on.

Certain embodiments use color on the display to indicate types of memory access, while other use display color to indicate a type of memory being represented in the display. In addition, certain embodiments of the present invention also use a 3-D version of a fractal curve, either drawn in 2D or rendered in 3D to aid in visualization of various aspects of memory. In accordance with the purpose of the invention, as embodied and broadly described herein, the invention relates to a method of displaying information, performed by a data processing system, comprising the steps of: receiving notification of a memory event, including a memory location; determining a portion of a fractal curve that corresponds to the memory location at which the memory event has occurred; and highlighting a portion of a display screen in accordance with the determined portion of the fractal curve.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF PREFERRED EMBODIMENTS

I. General Discussion

Figure 1:
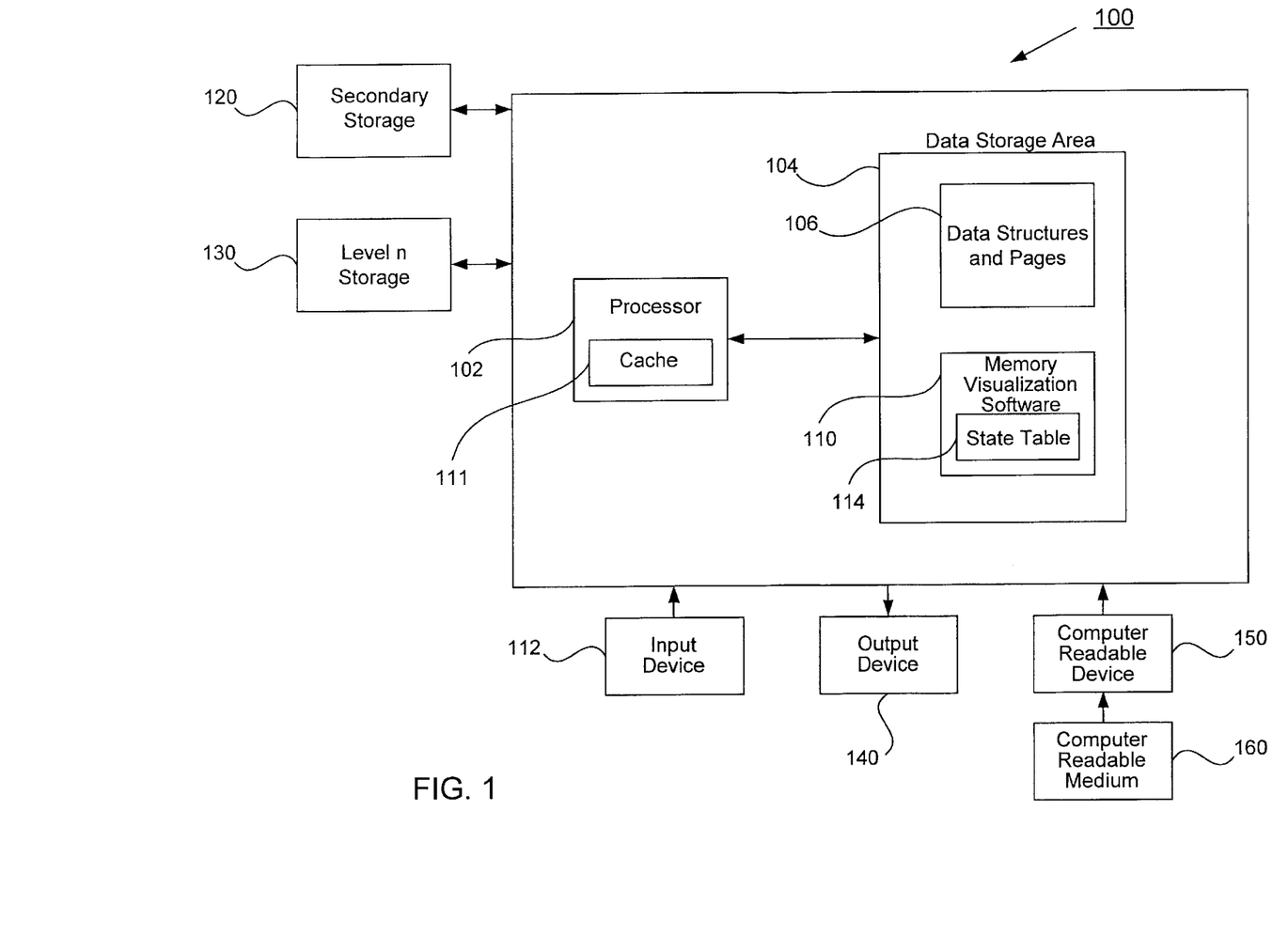
FIG. 1 is a block diagram of a computer system in accordance with one embodiment of the present invention.

FIG. 1 is a block diagram of a data processing system 100 in accordance with a preferred embodiment of the present invention. In FIG. 1, data processing system 100 includes a processor 102 and a data storage area (e.g., a memory) 104. The example of FIG. 1 shows that processor 102 contains an exemplary cache 111, although not all systems on which the present invention is implemented contain a cache and not all caches in such systems are necessarily located in processor 102. Data storage area 104 includes certain well-known types of data, such as data structures, pages, page tables, etc. 106. Storage area 104 also includes memory visualization software 110, which aids in visualization of various aspects of the computer system, as described below in detail. Memory visualization software 110 could also be located in a computer system different from system 100, such as a remote system (not shown). Storage area 104 preferably also includes software (not shown) for communicating with a network, such as a LAN, WAN, or the internet, although the invention also can be implemented on standalone computers.

System 100 preferably includes an input device 112, such as a keyboard, pointing device, mouse, touchpad, etc., which allows input to be read by processor 102. System 100 preferably also includes an output device 140. This output device can be, for example, a computer monitor, a display device, or any device that allows processor 102 to send or display output.

A person of ordinary skill in the art will understand that system 100 may also contain additional elements, such as input/output lines; input devices, such as a keyboard, a mouse, and a voice input device; and display devices, such as a display terminal. System 100 may also include a computer readable input device 150, such as a floppy disk drive, CD ROM reader, or DVD reader, that reads computer instructions stored on a computer readable medium 160, such as a floppy disk, a CD ROM, or a DVD disk. System 100 also may include application programs, operating systems, data, etc., which are not shown in the figure for the sake of clarity. It also will be understood that system 10 can also include numerous elements not shown, such as disk drives, keyboards, display devices, network connections, additional memory, additional processors or CPUs, LANs, input/output lines, etc.

In the following discussion, it will be understood that the steps of methods and flow charts herein discussed herein preferably are performed by processor 102 (or another appropriate processor) executing instructions stored in storage area 104 (or other appropriate memories or storage areas). It will also be understood that the invention is not limited to any particular implementation or programming technique and that the invention may be implemented using any appropriate techniques for implementing the functionality described herein. The invention is not limited to any particular programming language or operating system.

The instructions in storage area 104 may be read into storage area 104 from a computer-readable medium. Execution of sequences of instructions contained in main memory causes one of the processors to perform the process steps described herein. In alternative embodiments, hard-wired circuitry may be used in place of or in combination with software instructions to implement the invention. Thus, embodiment of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

II. Visualization of Memory

Figure 2:
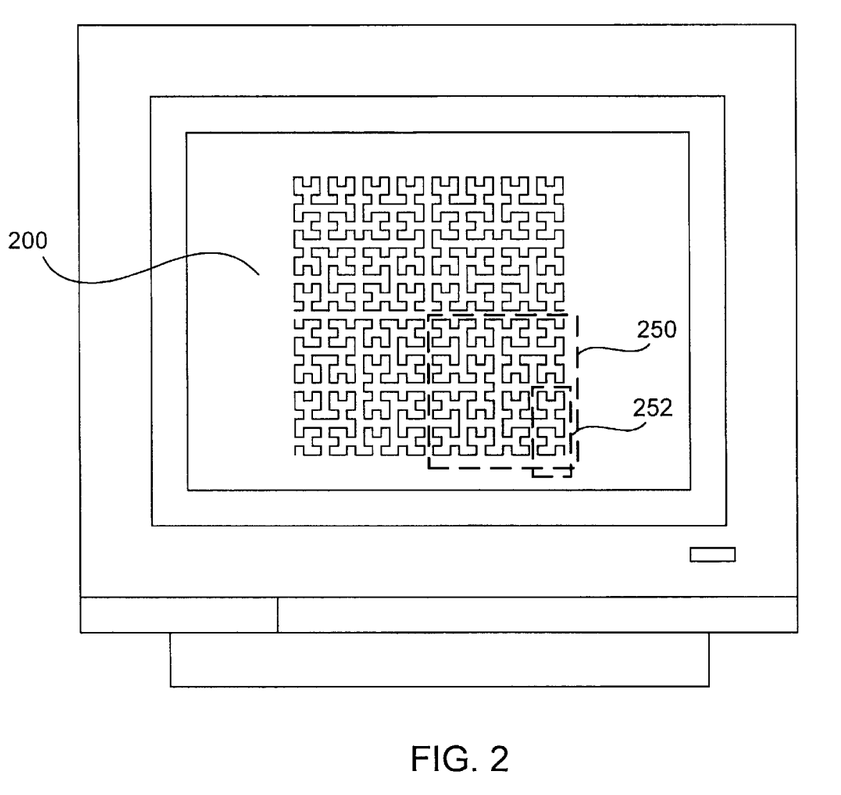
FIG. 2 shows an illustration of a curve used by a computer program of FIG. 1 as an aid to visualizing certain aspects of a computer memory of FIG. 1.

FIG. 2 shows a curve 200 used by a computer program of FIG. 1 as an aid to visualizing certain aspects of a computer memory of FIG. 1. In the described embodiment, the curve is not drawn explicitly. Instead, memory addresses of, for example, storage area 104 or cache 111, are mapped onto the curve. Curve 200 can, in fact, correspond to any appropriate memory, whether in the computer 100 or in a secondary storage 120. The display includes a fractal curve (such as a Hilbert curve), where each edge of the curve represents an associated portion or aspect of the memory. As explained below in more detail, use of a fractal curve to represent portions of or aspects of a memory allows a human being to more easily visualize relationships between the portions of memory.

Specifically, the use of a Hilbert curve allows each quadrant and subquadrant of the curve to correspond to respective bits of a memory address. The nature of a Hilbert curve allows easy visualization of the locality of memory/hardware, since addresses that reside on even powers of two map into quadrants and subquadrants of the fractal curve. Rectangular regions of the curve of a given size naturally correspond to hardware entities, such as cache lines or pages, so it is easy for a human being to see how memory access patterns map onto hardware. Portions of the display that are visually nested correspond to units of hardware that are logically nested. For example, in FIG. 2, curve 200 is used to aid in visualizing a ten bit address. FIG. 2 shows a portion 250 of curve 200 that corresponds to locations identified by a page (which has 256 locations). As a further example, FIG. 2 shows a smaller portion 252 of curve 200, nested within portion 250, that corresponds to a cache line (which has 32 locations).

Figure 3:
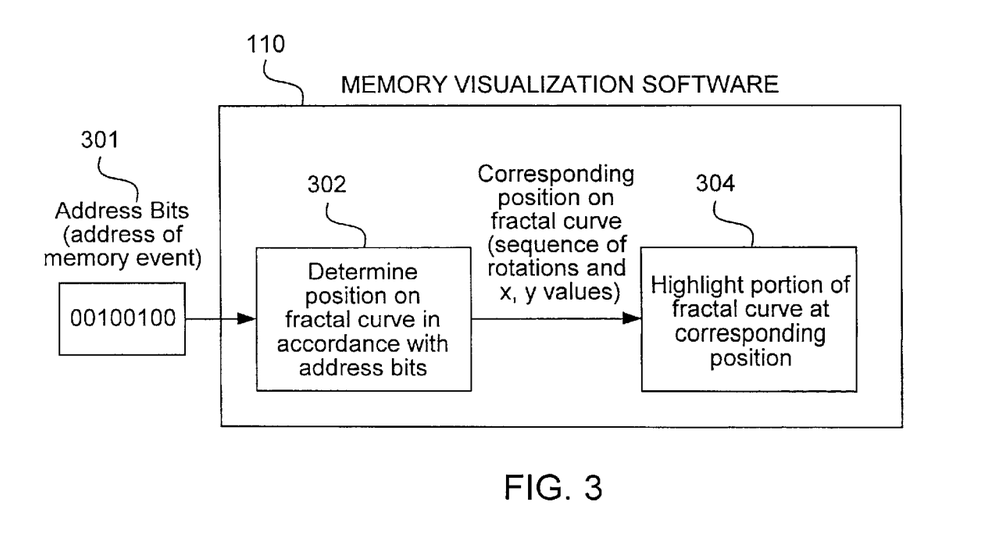
FIG. 3 is a block diagram showing an overview of steps performed by an embodiment of the invention to map portions of memory onto a fractal curve.

FIG. 3 is a block diagram showing an overview of steps performed by an embodiment of the invention to map portions of memory onto a fractal curve. In the described embodiment, the fractal curve is not drawn explicitly.

The steps of FIG. 3 can be performed by memory visualization software 110 being executed by processor 102. As shown, in step 301, software 110 receives notification of a memory event at a certain address. A memory event can be, for example, a memory access such as a read or write or a cache access. A memory event can also be the simple receipt of a next one of sequential memory addresses if the software 110 is to map all addresses in a memory onto the curve. In the described embodiment, notification of a memory event is received from the operating system of the data processing system, although notification of a memory event can be received from any appropriate source. For example, the Solaris operating system, available from Sun Microsystems, Inc., allows executing programs to request that the operating system notify them of certain memory events. (Solaris is a trademark or registered trademark of Sun Microsystems, Inc. in the United States and other countries.) As another example, other operating systems may allow the software 110 to poll the operating systems for the occurrence of memory events.

Step 302 determines a position on the fractal curve in accordance with the received memory address bits. Details of step 302 are shown in more detail in FIG. 4. Step 304 highlights the portion of the fractal curve corresponding to the received memory address. This portion can be a single pixel or a group of pixels, depending on the resolution of the particular implementation of the invention. Thus, for example, if software 110 is designed to highlight a portion of the curve whenever a read access occurs, every read access of a new address will highlight another pixel on the curve.

Figure 4:
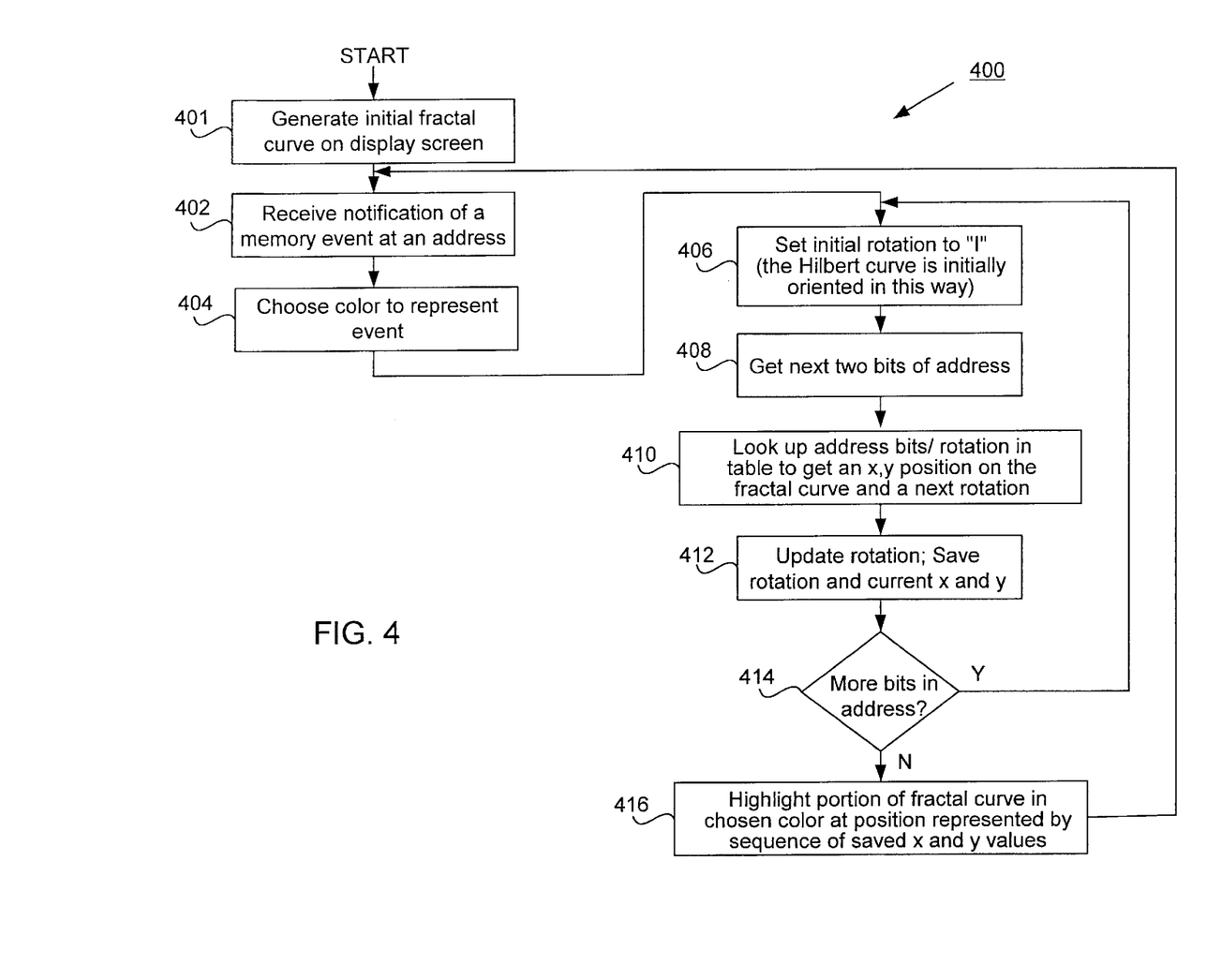
FIG. 4 is a flow chart showing steps performed by an embodiment of the present invention to map portions of memory onto a fractal curve.

FIG. 4 is a flow chart showing steps performed by an embodiment of the present invention to generate a fractal curve display, where the display indicates the localities of memory accesses. The flow chart shows details of step 302 and 304 of FIG. 3. Step 401 displays a fractal curve on the display. As discussed above, certain embodiments may not perform this initial step.

In step 402, software 110 receives notification of the occurrence of a memory event at a memory address and, in step 404, chooses a color to represent the event. In some embodiments, all memory events are indicated by a single color. In other embodiments, various types of memory events are indicated by different respective colors. For example, read accesses may be displayed in a first color, while write accesses may be displayed in a second color. As another example, all memory locations having a read permission may be displayed in a first color, while all memory locations having a read/write permission may be displayed in a second color. As a third example, all memory locations accessed a certain number of times per time unit may be displayed in a first color, while all memory locations accessed a different number of times per time unit may be displayed in a second color. As a fourth example, all memory locations filled from a cache may be displayed in a first color, while all memory locations filled from secondary storage may be displayed in a second color. As a fifth example, all memory locations in a cache that have been written back to secondary storage may be displayed in a first color, while all memory locations that have not been written back may be displayed in a second color.

Other variations using more than two colors will be apparent. As a sixth example, all memory locations having a shared, modified, or exclusive state are displayed in respective colors.

Steps 406 through 414 form a loop that determines which portion of the fractal curve corresponds to the received memory address. This loop preferably is repeated for each two bits of the received address. In step 406, an initial "rotation" is set to a value of "I" as described below in connection with FIG. 6. An initial rotation of "I" is chosen because, in the example, the Hilbert curve is initially oriented in this rotation. Other initial orientations are possible.

Figure 5:
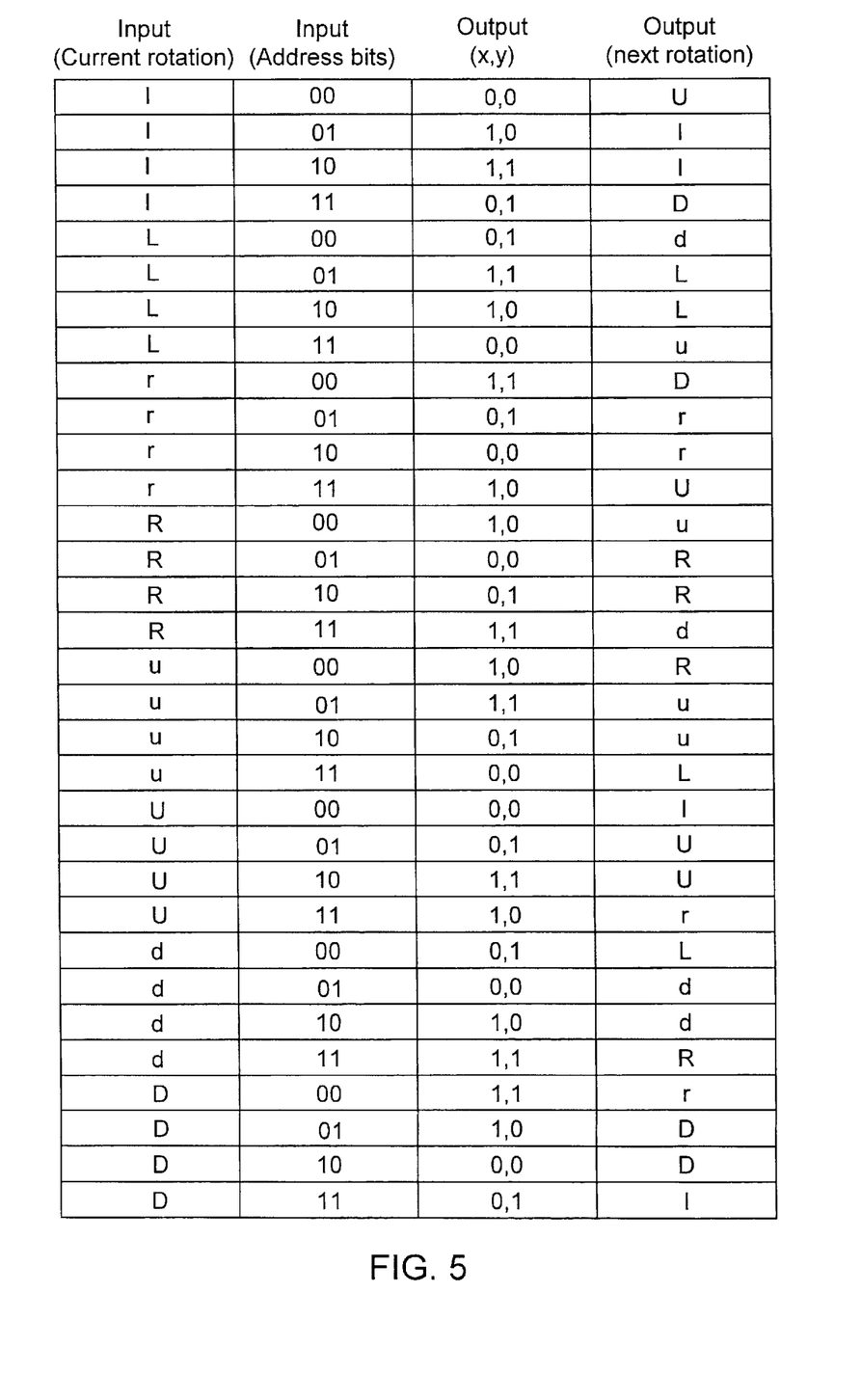
FIG. 5 shows a state table used by the flow chart of FIG. 4 to determine which portion of the fractal curve corresponds to a particular portion of memory.

Step 408 gets the next two bits of the received address. In step 410, software 110 uses the rotation and the two bits of the memory address to index into a state table as shown in FIGS. 1 and 5 to yield a "next rotation" value and new x,y values. These x,y values are saved for each iteration of the loop until an x,y value has been saved for each two bits of the received address. At this point, in step 416, software 110 highlights a portion of the fractal curve, in the chosen color, at a position on the curve represented by the saved sequence of x and y values. The saved x values can be concatenated to form the x position of the position on the curve. The saved y values can be concatenated to form the y position of the position on the curve. Further details of step 416 are shown by the examples below.

FIG. 5 shows an example of the state table 114 used by the flow chart of FIG. 4 to determine which portion of a fractal curve corresponds to a particular portion of memory. The state table 114 in the described embodiment includes input values: a current rotation value and two address bits; and output values: two x,y bits and a next rotation value. As discussed above, each two bits of a memory address along with a current rotation value are used to determine output x,y values and a next rotation value. The sequence of x,y values are saved and used to highlight a portion of the fractal curve corresponding to the memory address.

Figure 6:
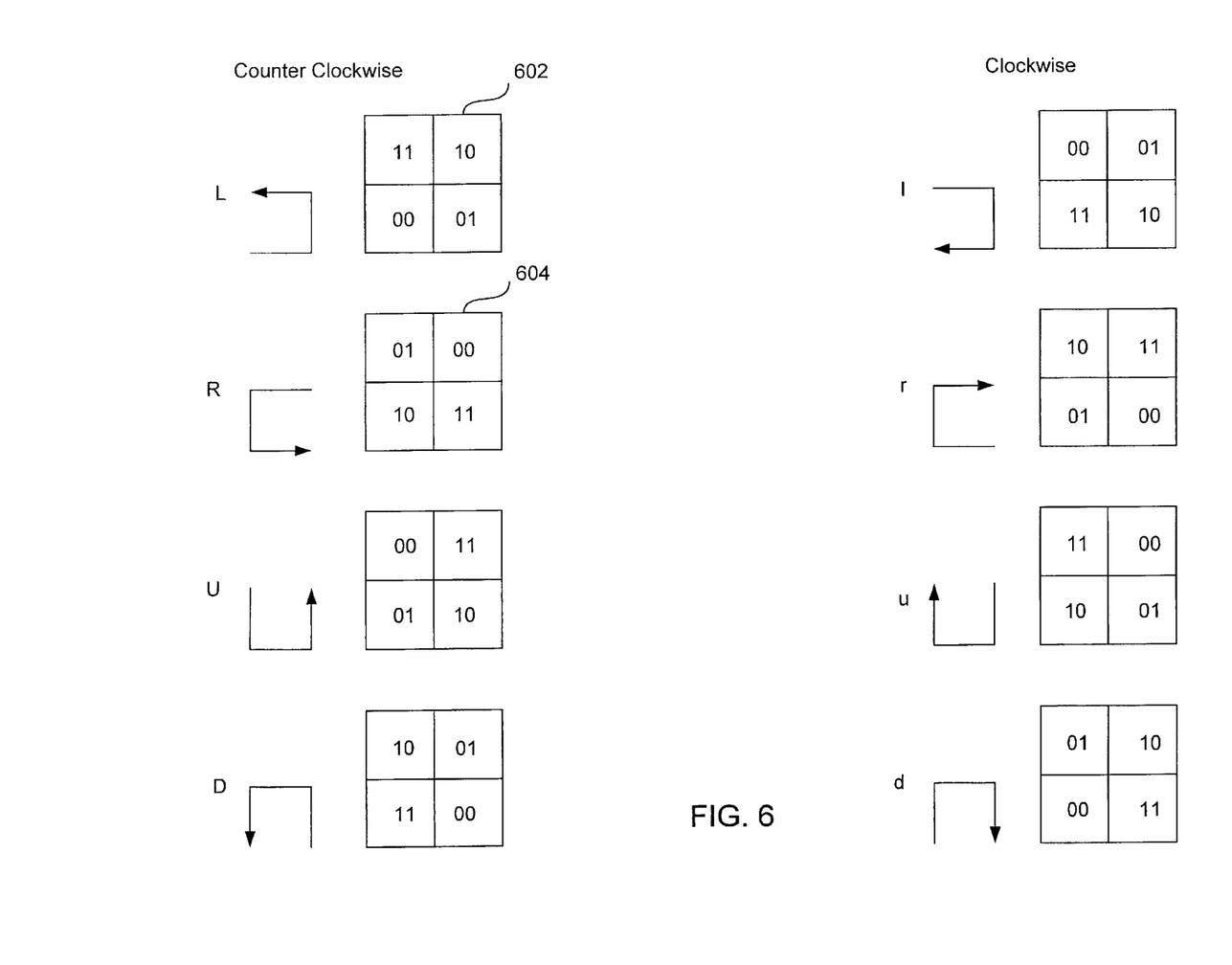
FIG. 6 shows possible rotation values for the state table of FIG. 5.

FIG. 6 shows possible rotation values for the state table of FIG. 5. A rotation value refers to the order of two bit values in a quadrant used to draw the fractal curve. For example, the "L" rotation value refers to an order 602 in which the two bit values 00, 01, 10, and 11 form a counterclockwise path, starting at a lower left quadrant. The "R" rotation value refers to an order 604 in which the two bit values 00, 01, 10, and 11 form a counterclockwise path, starting at an upper right quadrant. The other rotation values "U", "D", "I", "r", "u", and "d" are similarly shown.

Figure 7:
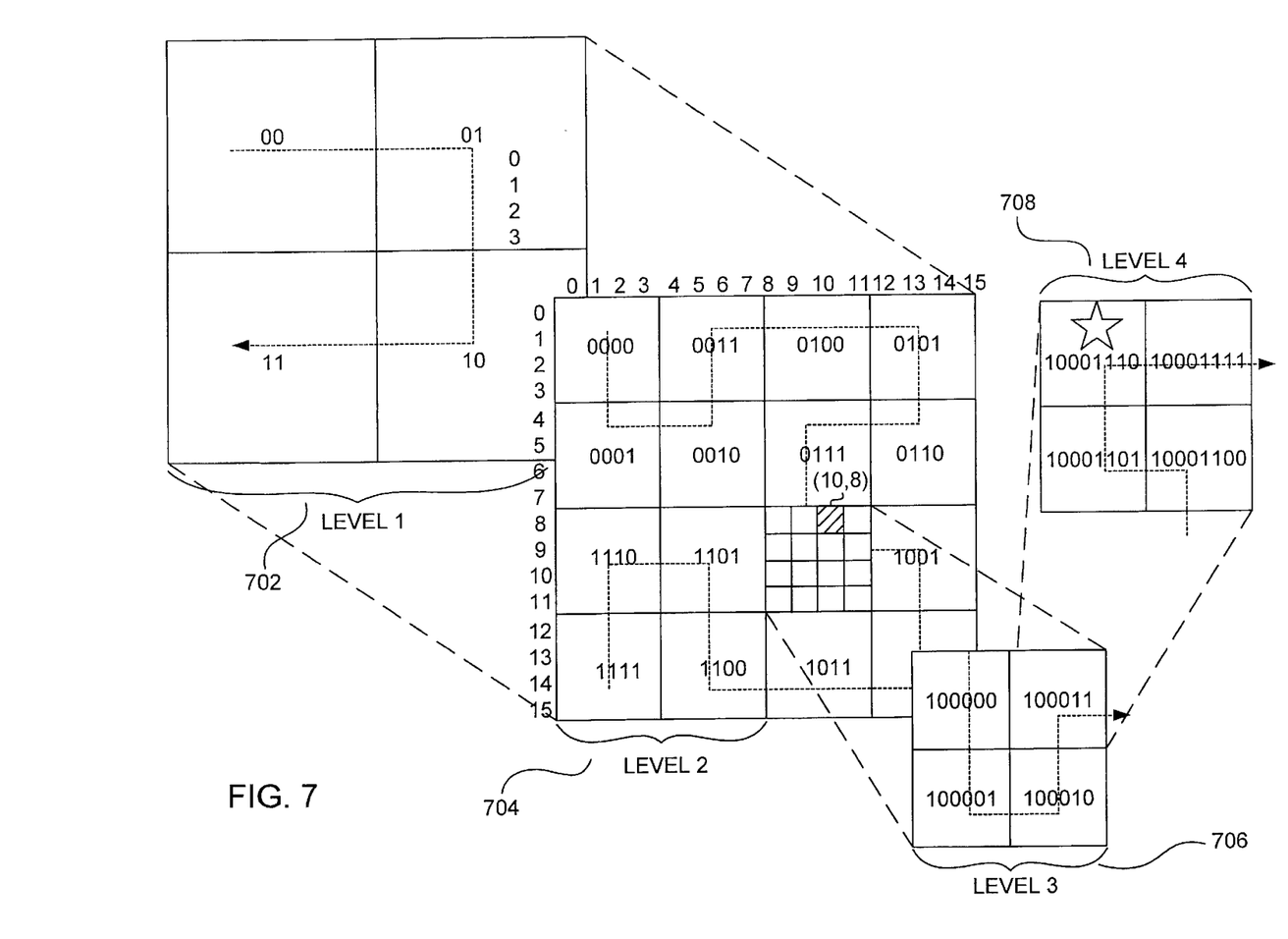
FIG. 7 shows an example of levels of quadrants used in the flow chart of FIG. 4.

FIG. 7 shows an example of levels 702, 704, 706, and 708 of quadrants used in the flow chart of FIG. 4. At a first level 702, the space in which the fractal curve is to be drawn in divided into four quadrants. Since, in the Figure, the rotation is "I", the quadrants are numbered clockwise from the top left as 00, 01, 10, and 11. As further shown, each quadrant in level 1 is broken into four level 2 sub-quadrants, each also numbered 00, 01, 10, and 11, the order of which depends on the rotation value associated with each sub-quadrant. As further shown, each sub-quadrant in level 2 is broken into four level 3 sub-sub-quadrants, each also numbered 00, 01, 10, and 11, the order of which depends on the rotation value associated with each sub-sub-quadrant. As further shown, each sub-sub-quadrant in level 3 is broken into four level 4 sub-sub-sub-quadrants, each also numbered 00, 01, 10, and 11, the order of which depends on the rotation value associated with each sub-sub-sub-quadrant.

Thus, in the example of FIG. 7, each level 4 sub-sub-sub-quadrant corresponds to one eight-bit memory address. Given an initial rotation and initial two address bits, a state table similar to the state table of FIG. 5 can be used to determine which portion of the fractal curve (i.e., which sub-sub-sub quadrant) corresponds to a given memory address. Note that the memory address can represent a single bit, a byte, a word, a cache line, a page, or any other appropriate memory unit.

It will be understood that the example of FIG. 7 is provided by way of example and that other fractal curves can have other organizations and that different lengths of memory addresses will have different numbers of levels of subquadrants. For example, a sixteen bit address where each edge of a level of the curve represents two address bits will have eight levels.

Figure 8:
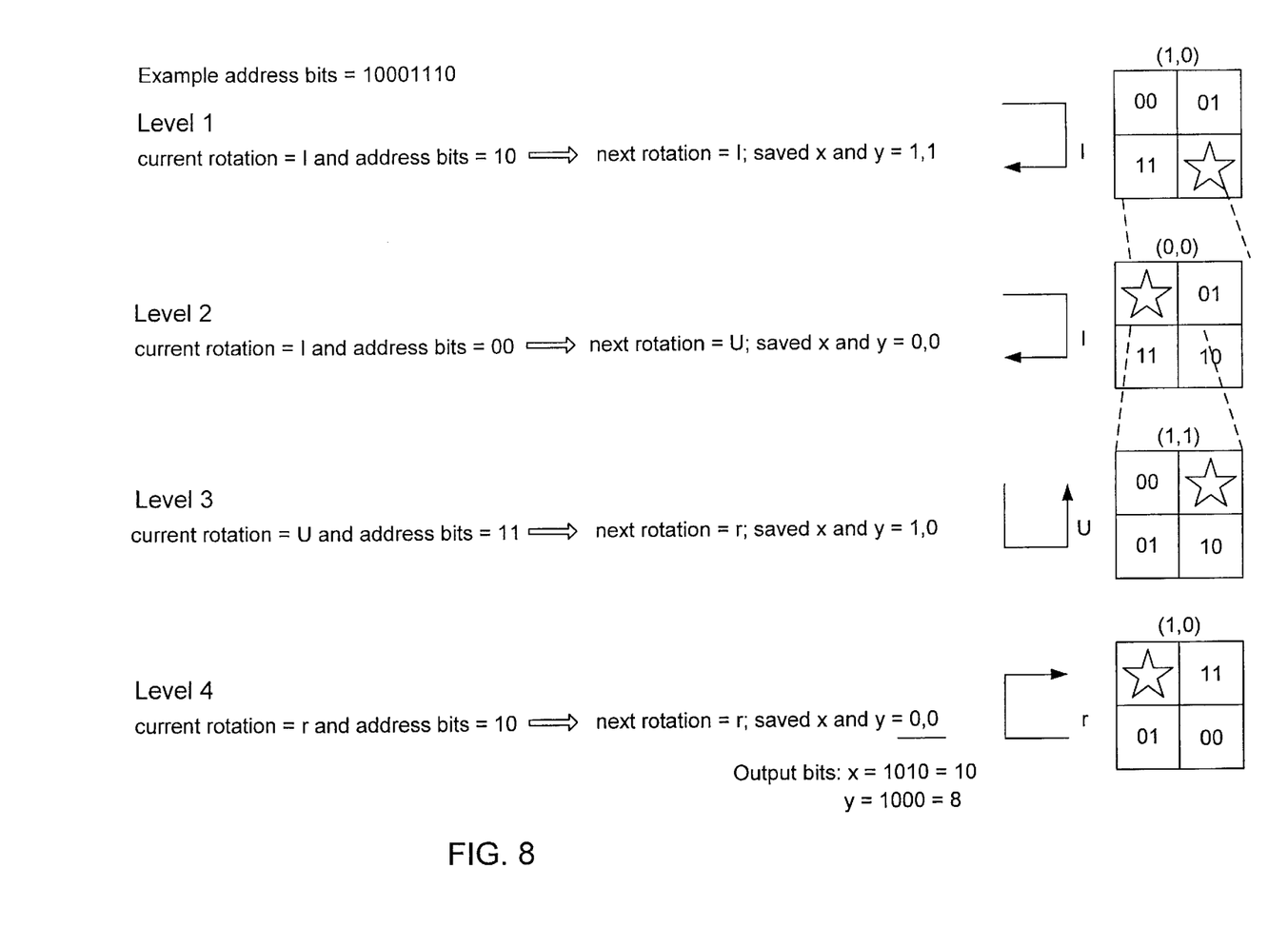
FIGS. 8 and 9 provide an example showing how to locate a portion of a displayed fractal curve corresponding to a memory address.
Figure 9:
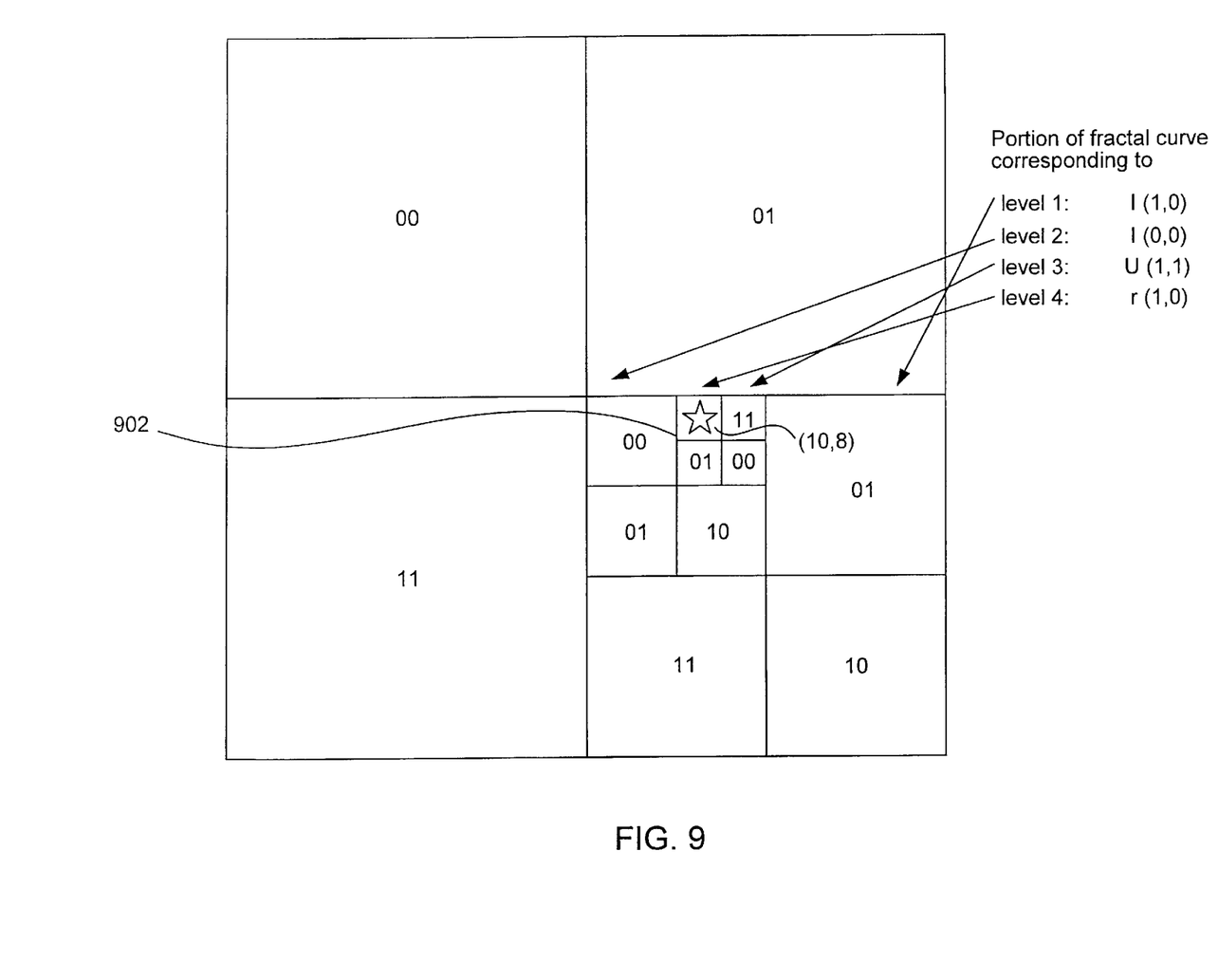

FIGS. 8 and 9 provide an example showing how to locate a portion of a displayed fractal curve corresponding to a memory address. In the example, software 110 determines a portion of a fractal curve corresponding to a memory address 10001110. Because the address has eight bits, four x,y pairs are determined and saved in one embodiment at level N storage 130 in accordance with the state table of FIG. 5. Specifically, as shown in FIG. 8, an initial rotation of "I" and initial two bit address values of 10 result in next rotation values of I, U, r, and r and further result in x,y pairs of 11, 00, 10, and 00.

As shown in the example of FIG. 9, the saved x,y pairs identify a portion 902 of the fractal curve. Specifically, in the example, the first rotation value "I" and the first two address bits 10 identify a bottom right quadrant in the first level. The second rotation value "I" and the second two address bits 00 identify a top left quadrant in the second level. The third rotation value "U" and the third two address bits 11 identify a top right quadrant in the third level. The fourth rotation value "r" and the fourth x,y pair 1,0 identify a top left quadrant in the fourth level. The top left quadrant is the curve portion 902 at position (10,8), which can be a single pixel or multiple pixels, and which corresponds to the received memory address.

Figure 10A:
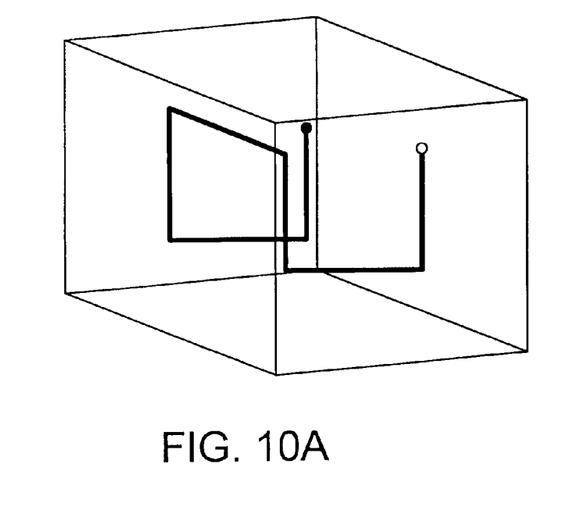
FIGS. 10(a) and 10(b) provide examples of three-dimensional fractal curves shown on a two-dimensional display.
Figure 10B:
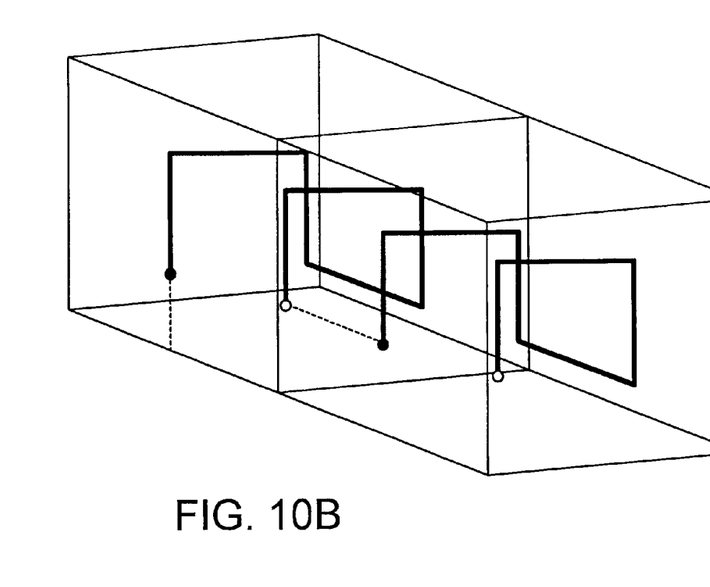

FIG. 10(*a*) shows an example of a first level of a three-dimensional fractal curve. FIG. 10(*b*) shows an example of a two connected three-dimensional fractal curves. This curve can be displayed to any desired depth of levels and in either two dimensions or three dimensions (given a proper display device), as is known by persons of ordinary skill in the art. As will be appreciated by persons of ordinary skill in the art, a portion of a three-dimensional curve corresponding to a memory address can be determined using a state table similar to that of FIG. 5.

In summary, the present invention displays memory locations in accordance with a fractal curve, such as a Hilbert curve. Use of a fractal curve to map memory locations causes locations having a similar locality to be displayed near each other, thus improving the ability of a human being to visually appreciate the locality of memory events.

While the invention has been described in conjunction with a specific embodiment, it is evident that many alternatives, modifications and variations will be apparent to those skilled in the art in light of the foregoing description. For example, the entire display can be updated at once, instead of pixel by pixel. Accordingly, it is intended to embrace all such alternatives, modifications and variations as fall within the spirit and scope of the appended claims and equivalents.

What is claimed is:

1. A method of displaying information, performed by a data processing system, comprising the steps of:

receiving notification of a memory event, including a memory location;

determining a portion of a fractal curve that corresponds to the memory location at which the memory event has occurred; and highlighting a portion of a display screen in accordance with the determined portion of the fractal curve.

2. The method of claim 1, further comprising the step of displaying the fractal curve on the display screen.

3. The method of claim 1, wherein the fractal curve is a Hilbert fractal curve.

4. The method of claim 1, wherein the memory location is a memory location that has a READ permission.

5. The method of claim 1, wherein the memory location is a memory location that has a READ/WRITE permission.

6. The method of claim 1, wherein the memory event reads from the memory location.

7. The method of claim 1, wherein the memory event writes to the memory location.

8. The method of claim 1, wherein the memory location has been accessed at least at a predetermined frequency.

9. The method of claim 1, wherein the memory location is a location in a cache memory that has been filled from another memory.

10. The method of claim 1, wherein the memory location is a memory location in a cache memory that has been written back to another memory.

11. The method of claim 1, wherein the highlighting step includes the step of highlighting a portion of a display screen in one of a plurality of colors, in accordance with a type of the memory event.

12. The method of claim 1, wherein the fractal curve is a three-dimensional fractal curve displayed in two dimensions.

13. The method of claim 1, wherein the fractal curve is a three-dimensional fractal curve displayed in three dimensions.

14. The method of claim 1, wherein the display is static and does not change once it is displayed.

15. The method of claim 1, wherein the display is dynamic and changes as corresponding memory events occur.

16. The method of claim 1, wherein the determining step includes the step of determining a portion of a fractal curve in accordance with a state table.

17. The method of claim 1, wherein a plurality of portions of the display screen corresponding to the fractal curve are highlighted at once.

18. The method of claim 1, wherein the memory location has one of a shared, modified, and exclusive state.

19. An apparatus that displays information, comprising:
   a portion configured to determine a portion of a fractal curve that corresponds to a memory location at which a memory event has occurred; and
   a portion configured to highlight a portion of a display screen in accordance with the determined portion of the fractal curve.

20. An apparatus that displays information, comprising:
   means for determining a portion of a fractal curve that corresponds to a memory location at which a memory event has occurred; and
   means for highlighting a portion of a display screen in accordance with the determined portion of the fractal curve.

21. A computer program product, comprising:
   a computer usable medium having computer readable code embodied therein for displaying information, including:
      computer readable program code devices configured to cause a computer to effect determining a portion of a fractal curve that corresponds to a memory location at which a memory event has occurred; and
      computer readable program code devices configured to cause a computer to effect highlighting a portion of a display screen in accordance with the determined portion of the fractal curve.

22. A computer data signal embodied in a carrier wave and representing sequences of instructions which, when executed by a processor, cause the processor to display information by performing the steps of:
   determining a portion of a fractal curve that corresponds to a memory location at which a memory event has occurred; and
   highlighting a portion of a display screen in accordance with the determined portion of the fractal curve.

* * * * *